3,247,171
PROCESS FOR HYDROLYZING A CROSS-LINKED ACRYLAMIDE POLYMER AND THE PRODUCT THEREBY

Harold J. Walker and John Lawrence Pillepich, Midland, Mich., assignors to The Dow Chemical Company, Midland, Mich., a corporation of Delaware
No Drawing. Filed Apr. 8, 1963, Ser. No. 271,458
8 Claims. (Cl. 260—80.3)

The present invention relates to improved water-swellable, cross-linked acrylamide polymers.

Water-swellable organic thickeners are incorporated into water employed in fighting fires or aqueous sprays or biologically active agents. One reason for the use of the thickeners is to increase the retention of the aqueous systems on the objects to which they are applied. Illustratively, forest fires spread the most rapidly through the tops of trees, especially the coniferous types. This makes the fires difficult to contain and control with water as most of the water runs off the trees. As a remedy it has been proposed to incorporate water-swellable thickeners into water applied to the trees whereby water run of is decreased and as a result the effectiveness of the applied water as a fire retardant blanket is increased.

In spraying biologically active agents several different problems are encountered. One of these is that while the spray is descending through the air under the force of gravity, a large percentage of the active ingredient may be dissipated in a relatively less effective vapor form. Depending upon the volatility of the biologically active agent and the height of the applicating spray means, losses through volatilization may render the spray technique economically unfeasible. Another aspect of the spray problem involves spray drift. To minimize such drift, it has been proposed to gel the spray composition such that upon spraying it forms large discrete and rapidly settling particles.

Numerous water-soluble gums are recognized thickeners for aqueous systems. Among these, one of the best known agents is chemically cross-linked polyacrylic acid. Such thickening polymers, however, suffer certain deficiencies rendering them somewhat inefficient for the above-mentioned fire fighting and biological spray gelling applications. For instance, the linear polymer gums have virtually no gel strength. While cross-linked polymers such as cross-linked polyacrylic acids have fair gel strengths, there is substantial room for improvement. Gel strength refers to that property of the water-swollen polymers which resists viscosity changes as a result of mechanical working or milling. Ordinarily, upon milling the gels tend to undergo degradation with accompanying general homogenization and loss in viscosity. While poor gel strengths can be combatted in the polymer design by preparing the polymer with larger amounts of a chemical cross-linking agent, this tactic results in reduction of the gel capacity of the cross-linked polymer. For a study of this variable, see P. J. Florey, Principles of Polymer Chemistry, Cornell University Press, Ithaca, New York, 1953, page 544. Gel capacity, as employed herein, is defined as the weight in grams of a water-swollen polymer drained of free water produced from one gram of dry polymer.

Another problem encountered with cross-linked polyacrylic acids stems from the propensity of the base monomer to homopolymerize to the exclusion of copolymerization with available difunctional cross-linking monomers. As a result, the finished polymer products often contain a high proportion of uncross-linked soluble polymer molecules which detract from the effectiveness of the polymer as a gelling agent on a weight basis.

It is an object of the present invention to provide a novel and improved gelling agent for aqueous systems. Particularly in this regard, it is an object to provide a gelling agent useful in aqueous systems employed for fire fighting and in gelled aqueous sprays for agronomic practices, such gelling agent having a high gel strength and a high swelling capacity, the latter property being maintained in the presence of hard water. A further object is the provision of a water-swellable polymer with high gel capacity and a low proportion of solubles.

The aforementioned objects and other benefits, which will become apparent hereinafter, are achieved in a water-swellable, cross-linked acrylamide corresponding to a terpolymer of acrylamide, alkali metal acrylate and an effective amount of a difunctional chemical cross-linker, the polymer being prepared according to the following process.

The process comprises the steps of polymerizing in water, substantally free of oxygen, an amount of acrylamide within the range from about 2 to about 20 percent by weight of the water and an amount of a difunctional organic cross-linker soluble in the aqueous monomer system. The amount of the cross-linker employed is within the range from about 0.005 to about 0.5 mole percent, preferably within the range from 0.01 to 0.2 mole percent, based on the moles of acrylamide. Also added to the aqueous polymerization system is a small but effective amount of a water-dispersible free radical catalyst for initiating ethylenic polymerization reactions. Polymerization is accomplished by mixing the foregoing ingredients together, removing the oxygen from the reaction system, as by purging it with an inert oxygen free gas, and heating the system at a temperature within the range from about 25 to 90° C. The heating is carried on for a period of time sufficient to effect substantial polymerization of the acrylamide whereby a water-swellable, cross-linked polyacrylamide is formed.

The resulting cross-linked acrylamide polymer is then partially hydrolized in aqueous solution with an alkali metal hydroxide. The amount of the alkali metal hydroxide employed is sufficient to convert from about 20 to about 40 percent of the available carboxamide groups to alkali metal carboxylate groups. This reaction can be accomplished by uniformly dispersing a predetermined quantity of the alkali metal hydroxide to give a desired degree of hydrolysis, preferably in the form of an aqueous solution, throughout the cross-linked acrylamide polymer gel. The alkalized polymer is then heated at an elevated temperature, e.g., within the range from 50 to 90° C. for a period of time to effect the desired hydrolysis. An alternate method involves first drying the cross-linked acrylamide polymer gel and then contacting the dried polymer with a suitable amount of an aqueous solution of the alkali metal hydroxide at an effective elevated temperature. If the latter technique is employed, the amount of water present in the hydrolysis reaction system should be adequate at least to substantially swell the polymer. Usually an amount of water from 4 to 10 times the weight of polymer is adequate.

The amount of the alkali metal hydroxide employed in either hydrolysis procedure should be at least about 20 mole percent and no more than a small excess over the 40 mole percent theoretically required to give 40 percent hydrolysis. That is no more than about 50 mole percent of the alkali metal hydroxide should be used. The foregoing mole percentage figures are based on the original moles of acrylamide monomer employed to prepare the polymer to be hydrolyzed. Preferred hydrolyzing agents are sodium and potassium hydroxides.

Organic compounds having two ethylenic groups copolymerizable with acrylamide in aqueous solution can be used as the cross-linking agents in the foregoing reaction. Exemplary cross-linkers include divinylbenzene sulfonate, ethylene glycol diacrylate, ethylene glycol dimethacrylate, propylene glycol diacrylate, allyl acrylate, diallyl ethylene glycol ether, divinyl ether, diallyl ether, divinyl ether of ethylene glycol, divinyl ether of diethylene glycol, divinyl ether of triethylene glycol, and the like difunctional organic monomers containing two $CH_2=C<$ groupings which organic materials are soluble to the extent of at least about 0.05 percent in the aforedescribed acrylamide-water solutions. Preferred cross-linking agents are N,N'-methylene-bis-acrylamide, N,N'-methylene - bis - methacrylamide and other lower alkylidene-bis-acrylamides wherein the alkylidene group has up to 4 carbons.

Examples of suitable catalysts for the described polymerization include peroxygen compounds such as sodium, potassium and ammonium persulfates, caprylyl peroxide, benzoyl peroxide, hydrogen peroxide, pelargonyl peroxide, cumene hydroperoxide, tertiary butyl diperphthalate, tertiary butyl perbenzoate, sodium peracetate, sodium percarbonate, and the like as well as azodiisobutyronitrile. The "redox" catalysts and the heavy metal activated catalyst systems can also be employed. Examples of the redox catalysts are combinations of one or more of (1) potassium persulfate, ammonium persulfate, sodium persulfate, the sodium and potassium perborates, sodium and potassium chlorates and the like as the oxidizing component of the catalyst with (2) reducing components such as the sulfites, bisulfites, hydrosulfites and thiosulfites of sodium and potassium, sulfurous acid, ethyl and other alkyl sulfites, nitrilotrisproprionamide, water-soluble tertiary amines such as triethanolamine and dimethylaniline. Such free radical catalyst systems and their manner of utilization are known to those skilled in the art. The amount of a particular catalyst used is the quantity thereof sufficient to effectively initiate the polymerization reaction at the temperature employed.

The following examples illustrate further embodiments of the invention. It is to be understood, however, the precise proportions of the materials utilized in the examples may be varied and, similarly, chemically equivalent materials may be employed in place of the reactants described without departing from the spirit and scope of the invention as defined in the appended claims.

EXAMPLE 1

To a polymerization reaction vessel was charged acrylamide and water in relative proportions to prepare a 10 percent solution of the monomer. N,N'-methylene-bis-acrylamide was added to the resulting solution in an amount of 0.092 mole percent based on the moles of acrylamide (2,000 parts per million parts of acrylamide monomer). The pH reaction system was adjusted to 6.4 and the temperature adjusted to about 35° C. At this point the reaction vessel was purged with nitrogen for about 30 minutes and thereafter sealed maintaining the reaction system under a nitrogen blanket. Polymerization was initiated by addition to the system of a catalytic amount of potassium persulfate, i.e., about 0.05 percent based on the weight of the monomer. After an initial period of about 15 minutes during which the polymerization proceeded adiabatically, the temperature of the system was increased to 85° C. and held there for about two hours.

The polymer gel thus produced was cooled to room temperature. Sufficient potassium hydroxide in the form of a 5 percent water solution thereof was added to the gel to hydrolize about 30 mole percent of the available carboxamide groups to the corresponding carboxylate groups. The hydroxide solution was thoroughly mixed with the polymer gel and the resulting mixture maintained at 75° C. for 18 hours. The cross-linked terpolymer of acrylamide, sodium acrylate and N,N'-methylene-bisacrylamide thus prepared was dried and ground to a fine, free flowing powder.

A 0.1 gram sample of the dried polymer was slurried in 250 milliliters of distilled water. The resulting dispersion was placed in a mechanical shaker for one hour after which the completely water-swollen polymer slurry was poured onto a 100 mesh sieve positioned over a large funnel discharging to a graduate cylinder. After permitting the water-swollen gel to freely drain into the graduated cylinder for about two hours the water in the cylinder (that water not absorbed by the polymer) was observed to be 174 milliliters. Subtracting this volume from 250 milliliters, the original volume of water and multiplying the difference (volume absorbed water) by ten and the specific gravity of water gave a swelling capacity for the polymer of 760 grams.

For the purposes of comparison a second polymer was prepared by copolymerizing in a 10 percent aqueous solution of monomer mixture containing two parts acrylamide and one part acrylic acid with sufficient caustic to stoichiometrically neutralize the acrylic acid. Also added to the monomer charge was 0.05 mole percent of N,N'-methylene-bis-acrylamide based on the total moles of acrylamide and acrylic acid. Polymerization was initiated by a small catalytic amount of a redox catalyst composed of about equal parts of each ammonium persulfate and beta dimethylaminopropionitrile. Polymerization was initiated and the reaction allowed to continue at ambient room temperature for about 8 hours. The cross-linked polymer thus prepared was dried and ground to a free flowing powder.

A sample of this polymer, which was one of the best gelling cross-linked polyacrylates known to applicants, was checked for its gel capacity according to the above-described procedure and was found to be characterized by a gel capacity of only 590.

It should be observed that, since other composition parameters of the copolymers are very close, the gel capacity of the cross-linked copolymer of acrylamide and sodium acrylate would be expected to be greater than that of the first cross-linked acrylamide polymer due to the lesser amount of cross-linker employed in its preparation. This conclusion is according to the generally accepted rule that lesser amounts of a cross-linker give greater gel capacities. Had an amount of the cross-linker equivalent to that employed in the preparation of the first polymer been employed in the preparation of the second copolymer, the gel capacity of the latter would have been even less than the reported value.

EXAMPLE 2

The present example illustrates the importance of controlling the percentage hydrolysis in the finished polymer. Several series of water-swellable, cross-linked acrylamide polymers were prepared according to procedures substantially identical to that described for the preparation of the post polymerization hydrolyzed polymer in Example 1. The variables were the amount of N,N'-methylene-bis-acrylamide (MBA) employed as a cross-linker and the percentage of hydrolyzed carboxamide groups in the finished polymer. Measurements were made of the percent solubles, i.e., that portion of the polymer lost by washing with water and the gel capacity of each polymer in hard water. The gel capacity was determined for hard water according to the procedure for gel capacity employed in Example 1 except that the water contained 300 parts per million of $CaCl_2$ and 500 parts per million of NaCl.

Table 1

| Polymer No. | MBA (mole percent) | Percent Hydrolysis [1] | Percent Solubles [2] | Gel Capacity in Hard Water (gms.) [3] |
|---|---|---|---|---|
| 1 | 0.016 | 4.47 | | 27 |
| 2 | 0.016 | 14.6 | 34.5 | 132 |
| 3 | 0.016 | 29.5 | 34.5 | 185 |
| 4 | 0.016 | 38.0 | | 124 |
| 5 | 0.092 | 5.2 | 26.5 | 60 |
| 6 | 0.092 | 12.7 | 24.4 | 106 |
| 7 | 0.092 | 19.4 | 25.0 | 129 |
| 8 | 0.092 | 22.6 | 16.0 | 146 |
| 9 | 0.092 | 29.7 | 22.5 | 162 |
| 10 | 0.092 | 35.5 | 38.0 | 157 |
| 11 | 0.092 | 39.4 | 33.0 | 123 |
| 12 | 0.092 | 43.0 | 44.5 | 114 |
| 13 | 0.16 | 6.28 | 21.5 | 58 |
| 14 | 0.16 | 15.0 | 16.0 | 110 |
| 15 | 0.16 | 25.8 | 19.0 | 142 |
| 16 | 0.16 | 26.2 | 20.0 | 152 |
| 17 | 0.16 | 35.0 | 17.0 | 155 |
| 18 | 0.16 | 39.5 | 24.0 | 129 |
| 19 | 0.16 | 44.0 | 25.0 | 115 |

[1] Extent of post polymerization hydrolysis of carboxamide groups to carboxylate groups with caustic.
[2] This refers to the polymer eluted from the gel by washing with water.
[3] It was assumed for the values reported here that the specific gravity of the hard water was 1.0.

EXAMPLE 3

This example illustrates the superior gel strengths of cross-linked acrylamide polymers prepared according to the invention in comparison to a cross-linked polyacrylic acid believed to be one of the more effective polymers of this class.

The polymer of the invention was prepared in accordance with the general procedure of Example 1. It contained 0.092 mole percent of N,N'-methylene-bis-acrylamide as a cross-linker and was about 30 percent hydrolyzed. The comparative cross-linked polyacrylic acid contained 0.46 mole percent of methylene-bis-acrylamide as the cross-linker and was completely neutralized with potassium hydroxide. The polymers were dispersed in separate aliquots of hard water (containing 300 parts per million calcium chloride and 500 parts per million sodium chloride) in amounts sufficient to provide dispersions each with 0.4 percent by weight polymer solids. Complete swelling of the polymers was achieved by shaking the dispersions for two hours with a mechanical shaker. Prior to measuring their viscosities the dispersed swollen polymers were milled 1½ minutes in a Waring Blendor operated at low speed.

The viscosities of the resulting sheared dispersions were measured with a Brookfield viscosimeter employing a No. 2 spindle at 60 r.p.m. The observed viscosities of the aqueous slurries of polymer of the invention and of the cross-linked polyacrylic acid salt were 382 and 82 centipoises, respectively.

Subsequently, the polymer dispersions were sheared again in a Waring Blendor for 1.5 minutes. Viscosities were measured as above and the polymer of the invention and the cross-linked potassium polyacrylate gave viscosities of 408 and 67 centipoises, respectively. While the viscosity of the polymer of the invention increased, the polyacrylate thickened material underwent 18 percent loss in viscosity.

What is claimed is:
1. A process which comprises the steps of (a) polymerizing in water at a temperature within the range from about 25 to about 90° C. in the presence of a free radical catalyst for the polymerization of ethylenically unsaturated groups an amount of acrylamide within the range from about 2 to about 20 percent by weight of the water and from 0.005 to about 0.5 mole percent based on the moles of acrylamide of a cross-linking monomer soluble in dilute aqueous solution of acrylamide and having two polymerizable ethylenic groups and (b) thereafter hydrolyzing the polymer at a temperature within the range from about 50 to about 90° C. with a sufficient amount of an alkali metal hydroxide to convert from about 20 to about 40 mole percent of the available carboxamide groups to alkali metal carboxylate groups.

2. A process which comprises the steps of (a) polymerizing in water at a temperature within the range from about 25 to about 90° C. in the presence of a free radical catalyst for the polymerization of ethylenically unsaturated groups an amount of acrylamide within the range from about 2 to about 20 percent by weight of the water and from 0.005 to about 0.5 mole percent based on the moles of acrylamide of a N,N'-alkylidene-bis-acrylamide, the alkylidene group having from 1 to 4 carbons and (b) thereafter hydrolyzing the polymer at a temperature within the range from about 50 to about 90° C. with a sufficient amount of an alkali metal hydroxide to convert from about 20 to about 40 mole percent of the available carboxamide groups to alkali metal carboxylate groups.

3. A process which comprises the steps of (a) polymerizing in water substantially free of oxygen at a temperature within the range from about 25 to about 90° C. in the presence of a free radical catalyst for the polymerization of ethylenically unsaturated groups, and amount of acrylamide within the range from about 2 to about 20 percent by weight of the water and from about 0.005 to about 0.5 mole percent based on the moles of acrylamide of a N,N'-methylene-bis-acrylamide and (b) thereafter hydrolyzing the polymer at a temperature within the range from about 50 to about 90° C. with a sufficient amount of an alkali metal hydroxide to convert from about 20 to about 40 mole percent of the available carboxamide groups to alkali metal carboxylate groups.

4. A process as in claim 3 wherein the alkali metal hydroxide employed is sodium hydroxide.

5. A process as in claim 3 wherein the alkali metal hydroxide employed is potassium hydroxide.

6. A product by the process of claim 1.

7. A product by the process of claim 2.

8. A product by the process of claim 3.

References Cited by the Examiner
UNITED STATES PATENTS 3,002,960  10/1961  Kolodny _____ 260—80.3 X
3,022,279  2/1962   Proffitt _____ 260—80.3 X
3,061,595  10/1962  Dorion et al. _____ 260—80.5

JOSEPH L. SCHOFER, *Primary Examiner.*

WAYNE HOOVER, *Assistant Examiner.*